July 22, 1930.  A. S. REYNOLDS ET AL  1,771,352
CLUTCH MECHANISM
Filed Oct. 10, 1925    2 Sheets-Sheet 1
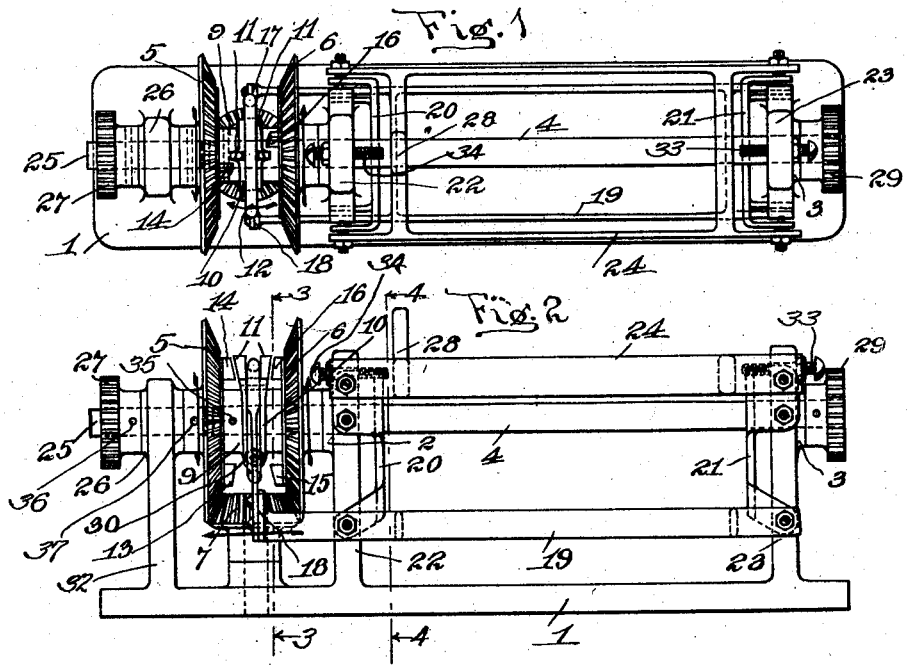
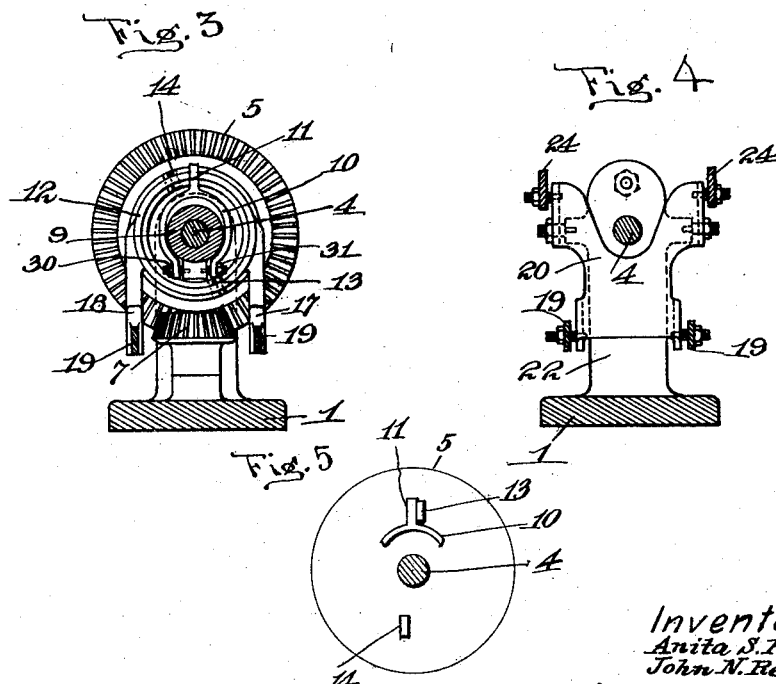
Inventors
Anita S. Reynolds
John N. Reynolds
by Jas. F. Coleman
their Attorney July 22, 1930.  A. S. REYNOLDS ET AL  1,771,352
CLUTCH MECHANISM
Filed Oct. 10, 1925  2 Sheets-Sheet 2
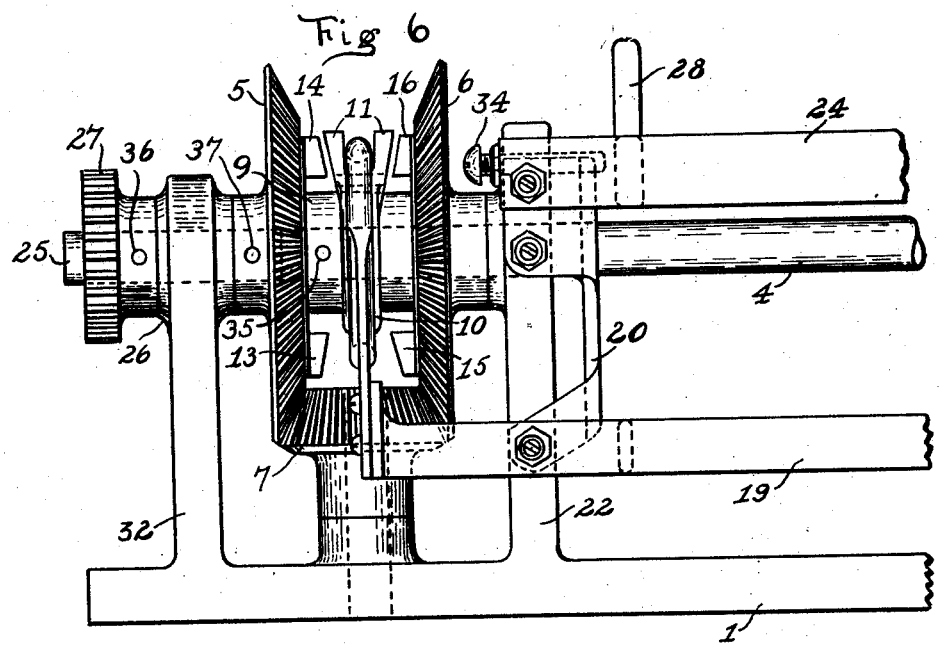
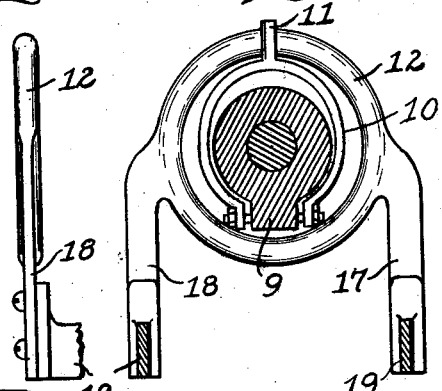
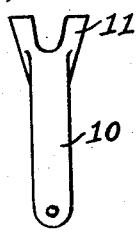
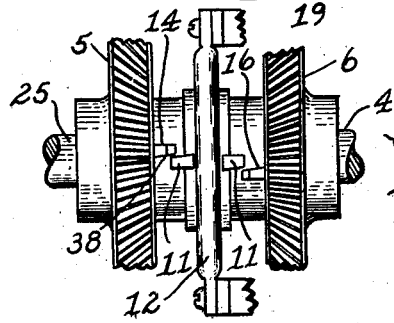
INVENTORS
Anita S. Reynolds.
John N. Reynolds Patented July 22, 1930

1,771,352

UNITED STATES PATENT OFFICE

ANITA S. REYNOLDS AND JOHN N. REYNOLDS, OF GREENWICH, CONNECTICUT

CLUTCH MECHANISM

Application filed October 10, 1925. Serial No. 61,647.

The object of the invention is to provide a clutch in which frictional losses are reduced to a minimum, which may be used to connect a movable element with a moving element or to connect a rotatable element with a member rotating clockwise or with one rotating counterclockwise, and by which the engagement and disengagement are accomplished with a minimum of effort, and the resultant combination will provide a highly efficient mechanical power amplifier.

One of the features of the invention is the provision of a pivoted clutch member in place of the conventional sliding type.

Another feature is the provision of pivoted clutch member with a bifurcated top section which engages with a floating ring in such manner that when the ring is moved in a direction parallel to the axis of the clutch, the latter may be engaged or disengaged.

Another feature is the provision of means to maintain the engaging ring in a plane at right angles to the axis of the clutch at all times.

Still another feature is the provision of a balanced floating means for carrying the engaging ring that has a minimum gravitational loss.

One embodiment of the invention is illustrated in the accompanying drawing in which like parts in all of the several figures are designated by corresponding characters of reference, and in which Fig. 1 is a plan view of a clutch mechanism embodying the invention.

Fig. 2 is a side elevation.

Fig. 3 is a section on the line 3—3 of Fig. 2.

Fig. 4 is a section of the line 4—4 of Fig. 2.

Figure 5 is a detail of the clutch engaging surfaces.

Fig. 6 is a partial enlarged side elevation of the clutch mechanism.

Fig. 7 is an edge detail view of the clutch engaging ring.

Fig. 8 is a side detail view of the clutch engaging ring and clutch yoke.

Fig. 9 is a detail view of the clutch yoke.

Fig. 10 is a partial enlarged plan view of the clutch mechanism.

Referring to the drawings, 1 is a base or support for carrying the mechanism having posts 22, 23 and 32. Mounted in bearings 2 and 3 on the posts 22 and 23 is a shaft 4. Loosely running on shaft 4 are two spaced and oppositely disposed bevel gears, 5 and 6, each of which meshes with a pinion 7, which is rotatably mounted on the base 1. Power may be supplied to the gears through either of the bevel gears 5 and 6, or through the pinion 7. If power is supplied through pinion 7 then shaft 4 may be extended entirely through gear 5, omitting pin 37 and permitting both gears 5 and 6 to revolve loosely on shaft.

Rigidly secured to the shaft 4, between gears 5 and 6 by a pin 35, is a block 9, to which is pivotally mounted a yoke 10 having a forked end 11 carrying clutch surfaces. The forked portion straddles a ring 12, the latter surrounding the shaft 4, block 9 and yoke 10.

The gear 5, is provided with lugs or clutch surfaces 13 and 14, and gear 6 carries similar lugs 15 and 16. The clutch yoke 10, is adapted to be moved into the path of lugs 13 and 14 on gear 5, and also into the path of lugs 15 and 16 on gear 6, or to remain midway between the two gears without engaging any of the lugs.

The ring 12, is mounted upon the ends 17 and 18 of a frame 19, which is pivotally mounted to the lower ends of yokes 20 and 21 pivotally mounted on posts 22 and 23, which are part of base 1.

A frame 24, is pivotally mounted to the upper ends of yokes 20 and 21, and above the pivots of the yokes.

The screws 33 and 34 carried by the posts 23 and 22 restrict the movement of the frame 24, and thus the movement of the ring 12.

The two gears 5 and 6 are loosely mounted on the shaft 4, but the end of the latter extends only a short distance into the hub of the gear 5, and another shaft 25, extends through a bearing 26 carried on the post 32, and has pinned to it by pin 37 the gear 5 and by pin 36 a driving pinion 27.

The operation of the apparatus as above described is as follows:

Applying power to the gear 27 causes the gear 5 to revolve in a counterclockwise direction as viewed in Fig. 3. This revolves the gear 6 in a clockwise direction through the pinion 7. In the condition, shown in the drawings, the gears 5 and 6 will rotate relatively to the shaft 4, and the latter will not revolve. If pressure be now applied to the frame 24, as by engagement with a projection 28 on the frame, to move the frame towards the gear 6, the lower frame 19 will be moved in the opposite direction through the yokes 20 and 21. This movement will cause the ring 12 to move toward the gear 6, tilting or swinging the forked end 11 of yoke 10 into the path of either the lug 15 or 16 which are attached to the gear 6. The continued rotation of the gear 6 engages the lug 15 or lug 16 with the corresponding forked end of the yoke 10 and causes the shaft 4 to be revolved in unison with the gear 6. When the frame 24 is moved back to the normal position, the yoke 10 is disengaged from the lug 15 or 16 and the rotation of the shaft 4 ceases.

If now the frame 24 is moved in the opposite direction away from gear 6, the frame 19 will be moved toward the gear 5 and the ring 12 will tilt the forked end 11 of yoke 10 into the path of the lug 13 or 14 of gear 5. When the lug 13 or 14 engages with the clutch surface of yoke 10, the shaft 4 will be caused to revolve in the opposite direction. As the shaft 4 revolves in either direction power may be taken from a gear 29, keyed to the outer end of the shaft 4.

The clutch members 13, 14, 15, and 16, and the surfaces of the yoke 10 are given a slight bevel as shown at 38, Fig. 10, so that a minimum of force is required to disengage them when power is being taken from gear 29.

Also the yoke 10, being movably mounted on the block 9, as by means of pivots 30 and 31, is tilted by the expenditure of a minimum of force, and since the two yokes 20 and 21 are pivotally mounted to the posts 22 and 23, and the upper frame 24 and lower frame 19 are likewise pivoted to the yokes 20 and 21, a minimum of force is required to move the whole system to effect clutch engagement and disengagement.

In practice the weight of frame 24 may be balanced with the weight of frame 19 so that in moving the floating system, gravity will not tend to restore it to a neutral position.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described, what is claimed and desired to be secured by Letters Patent is—

1. A mechanical movement, comprising a pair of bodies adapted to rotate in opposite directions, an element adapted to be tilted into engagement with either of said bodies, a floating annulus having a fixed angular position in surrounding relation to said element and adapted to cause an engagement between said element and either of said bodies.

2. A mechanical movement, comprising a pair of bodies adapted to rotate in opposite directions, a pivotally supported annulus having a fixed angular position, a swinging element mounted within the circumference of said annulus and adapted to engage with either of said bodies through a movement of said annulus.

3. In a clutch mechanism, a rotatable shaft having two members loosely mounted thereon, a clutch engaging element pivotally attached to said shaft between the two loosely mounted members said element having a free end bifurcated and a ring member engaging with said bifurcated end and adapted to move said clutch element into engagement with either of the two said members.

4. A mechanical movement comprising a pair of gears adapted to rotate in opposite directions, a clutch element pivotally mounted to be moved relatively to said gears and engage with either of them, a freely moving member in surrounding relation to said element, said member mounted to prevent rotation, and pivoted means for moving said member parallel to the axes of the gears to effect engagement between said element and either gear.

5. Clutch mechanism, comprising a power shaft, a driven shaft, a gear secured to the power shaft, a gear loosely mounted on the driven shaft, said gears being in axial alinement, a pinion engaging said other gears, a member secured to the driven shaft and between the gears, a clutch element pivoted to the member, a ring surrounding said member and engaging said element, a frame for supporting the shafts, and means pivoted to the frame and supporting said ring for moving the element into engagement with either of the gears.

6. A mechanical clutch comprising a plurality of rotatable bodies, a shaft to be rotated, a clutch gripping member pivotally associated with said shaft and a shipper element rigidly attached to a pivotally suspended frame, said element being in surrounding relation to said member to cause said member to effect said engaging.

7. A mechanical movement, comprising a rotating body, a normally stationary body, a member having swinging attachment to said second body and adapted to engage with said first body and a balanced floating element having a fixed angular position adapted to cause said member to engage with said first body and be rotated by it.

8. A mechanical clutch mechanism comprising two gears adapted to rotate in opposite directions, a pivoted element normally stationary with respect to said gears, a pivotally supported non-rotating ring surrounding said element and means whereby said element may be brought into engagement with either of said gears by moving said ring.

9. In a clutch mechanism a rotatable shaft having two members loosely mounted thereon, a clutch element having swinging attachment to said shaft between said members, a ring surrounding said element and engaging with the free end thereof, and means whereby the free end of said element may be moved into engagement with either of the two said members at any angular position by a movement of said ring.

10. A mechanical movement, comprising a pair of gears adapted to rotate in opposite directions, an element adapted to engage with either of said gears, a pivoted parallelogram, a member mounted on said parallelogram and associated with said element in a manner to cause said engagement by means of a movement of said parallelogram.

11. A mechanical movement, comprising a pair of bodies adapted to rotate in opposite directions, a plurality of pivoted members, an element mounted to be moved relatively to said bodies and to engage with either of them, a member surrounding and associated with said element to effect the engagement, said member being mounted on said plurality of pivoted members permittitng motion parallel to the axes of the bodies.

12. A mechanical movement, comprising a pair of bodies adapted to rotate in opposite directions, an element adapted to be tilted into engagement with either of said bodies, a non-rotating floating member, and means for moving said member to cause said element to cause said engagement.

13. A mechanical clutch mechanism, comprising a plurality of gears, an element mounted to be moved into engagement with any one of said gears, a member in surrounding relation to said element, a frame pivotally supported by a plurality of pivoted lever arms, said member being mounted on said frame.

14. A mechanical clutch mechanism, comprising a pair of bodies adapted to rotate in opposite directions, a rotatable shaft, a clutch element having swinging attachment with said shaft, a member having loose engagement with said element, a double frame, said member being mounted upon one portion of said frame, the two portions of said frame movable in opposite directions to effect engagement between said element and either of said bodies.

15. A mechanical clutch, comprising a pair of bodies adapted to rotate in opposite directions, a rotatable shaft, a clutch element having swinging attachment to said shaft, a member having loose engagement with said element, a double frame, said member being mounted upon one portion of said frame, the two portions of said frame movable in opposite directions to effect engagement between said element and either of said bodies.

16. A mechanical clutch, comprising a pair of bodies adapted to rotate in opposite directions, a rotatable shaft, a clutch element having swinging attachment to said shaft, a member having loose engagement with said element, a movable frame, said frame rigidly supporting said member, said frame being pivotally supported in swinging relation to said clutch.

17. A mechanical clutch, comprising a pair of bodies adapted to rotate in opposite directions, a rotatable shaft, a clutch element having swinging attachment to said shaft, a member having loose engagement with said element, a swinging structure having an upper and a lower portion, said structure being pivotally mounted at points between said upper and said lower portions.

This specification signed and witnessed this 8th day of October, 1925.

ANITA S. REYNOLDS.
JOHN N. REYNOLDS.